United States Patent
Winkler

(10) Patent No.: US 6,769,735 B1
(45) Date of Patent: Aug. 3, 2004

(54) INTEGRAL BIFOLD SEAT SYSTEM

(75) Inventor: Edward R. Winkler, St. Peters, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/377,478

(22) Filed: Feb. 28, 2003

(51) Int. Cl.[7] ............................................... B60N 2/26
(52) U.S. Cl. ..................................... 297/112; 297/238
(58) Field of Search ............................. 297/112, 113, 297/188.04, 146, 238

(56) References Cited

U.S. PATENT DOCUMENTS

| 157,377 | A | * | 12/1874 | Cobb | 297/62 |
| 2,966,201 | A | * | 12/1960 | Sthahler | 297/238 |
| 3,094,354 | A | * | 6/1963 | Bernier | 297/112 |
| 4,722,568 | A | * | 2/1988 | Irvin | 297/238 |
| 4,756,573 | A | * | 7/1988 | Simin et al. | 297/250.1 |

FOREIGN PATENT DOCUMENTS

| GB | 2023415 A | * | 1/1980 |
| JP | 05162575 A | * | 6/1993 |

* cited by examiner

Primary Examiner—Peter M. Cuomo
Assistant Examiner—Joseph Edell
(74) Attorney, Agent, or Firm—Black Lowe & Graham PLLC

(57) ABSTRACT

A seat back cushion assembly for a vehicle is provided. The assembly includes a cushion frame configured to pivotally attach to a seat frame to form a seat assembly. A first seat cushion is rotatably and slidingly attached to the cushion frame and configured to rotate from a first position to a second position and to slide from a second position to a third position such that, in the first position, the first seat cushion is configured to receive an infant and in the second and third positions, to serve as a cushion seat back. A second seat cushion is configured to rotate from a fourth position to cooperate with the first seat cushion to form a seat for receiving a child to a fifth position of the second seat cushion to cooperate with the first cushion in the third position to form a seat back for an adult.

24 Claims, 10 Drawing Sheets

INTEGRAL BIFOLD SEAT SYSTEM

FIELD OF THE INVENTION

This invention relates generally to seating and, more specifically, to vehicle seating.

BACKGROUND OF THE INVENTION

Major airlines have long had the consideration of the accommodation of adults as one of the principal factors in cabin layout. Recently however, both the airline and the automotive industries have become sensitive to the shortcomings of adult seating for the accommodation of infants. Little bodies are not well protected against movement in the course of 16 G acceleration by seats designed for adults.

Recently, several seats have been designed with an integrated child seat. Among these are, for example, those described in United States patents granted to Dukatz, et al. (U.S. Pat. No. 5,704,684), Handa, et al. (U.S. Pat. No. 5,829,833), and to Lambert, et al. (U.S. Pat. No. 6,089,662). These patents describe an adult seat that can be reconfigured to serve as an integrated child's seat. However, these seats lack accommodation for the smallest of passengers, that is infants.

Therefore, there exists an unmet need in the art for a seat that can be configured to safely accommodate, alternately, an adult, a child, and an infant.

SUMMARY OF THE INVENTION

The invention provides a seat back cushion assembly for a vehicle. The assembly includes a cushion frame configured to pivotally attach to a seat frame to form a seat assembly. A first seat cushion is rotatably and slidingly attached to the cushion frame and configured to rotate from a first position to a second position and to slide from a second position to a third position such that, in the first position, the first seat cushion is configured to receive an infant and in the second and third positions, to serve as a cushion seat back. A second seat cushion is configured to rotate from a fourth position to cooperate with the first seat cushion to form a seat for receiving a child to fifth position where the second seat cushion cooperates with the first cushion in the third position to form a seat back for an adult.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENTS

By way of overview, a seat back cushion assembly for a vehicle is provided. The assembly includes a cushion frame configured to pivotally attach to a seat frame to form a seat assembly. A first seat cushion is rotatably and slidingly attached to the cushion frame and configured to rotate from a first position to a second position and to slide from a second position to a third position such that, in the first position, the first seat cushion is configured to receive an infant and in the second and third positions, to serve as a cushion seat back. A second seat cushion is configured to rotate from a fourth position to cooperate with the first seat cushion to form a seat for receiving a child to fifth position where the second seat cushion cooperates with the first cushion in the third position to form a seat back for an adult.

Figure 1A:
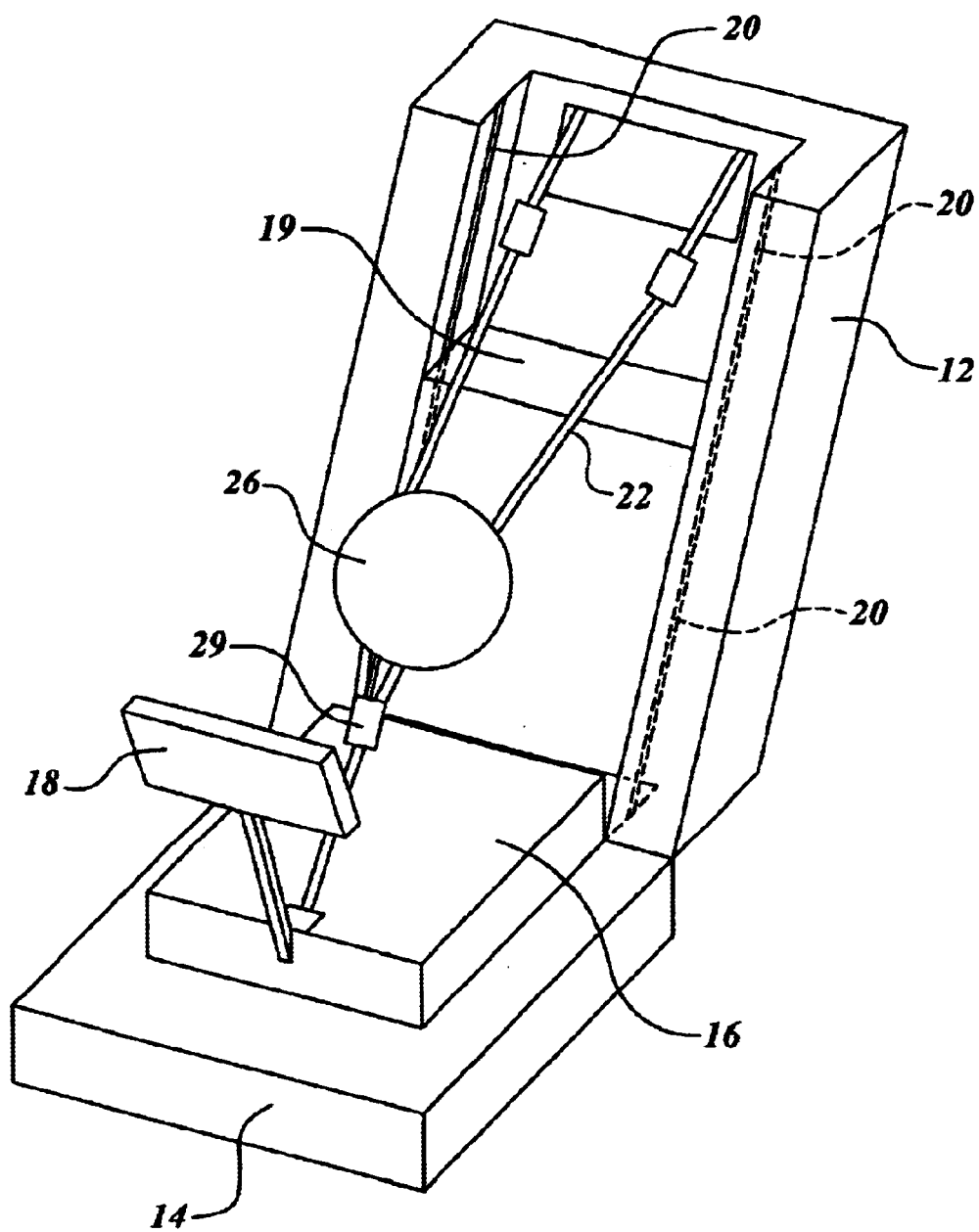
FIG. 1a is a phantom view of a seat according to the invention in position as a child seat.

FIG. 1a shows a phantom view of one embodiments of the invention in position as a child seat. In the illustrated embodiment two rails 20 are embedded in the seat wings and back 12. These rails facilitate sliding movement by an upper back cushion 19. A lower back cushion 16 pivots outward to substantially horizontal position where it covers a seat cushion 14. By pivoting outward, the lower back cushion 16 creates a vacancy that the upper back cushion 19 slides down on the rails 20 to fill by the natural action of gravity or assisted by the efforts of the user.

To further the child seat's utility as a means for restraining a child in a 16 G acceleration, shoulder safety belts 22 and a crotch belt 29 connect at a chest plate 26, thereby restraining the child in place. The shoulder safety belts 22 extend from anchor points 30 to the chest plate 26. The crotch belt 29 extends from the chest plate 26 and an anchoring buckle 28 that is secured to the lower back cushion 16. Also attached to the lower back cushion 16 in one embodiment is an audio-visual entertainment module 18 based in proximity to the anchoring buckle 28.

Figure 1B:
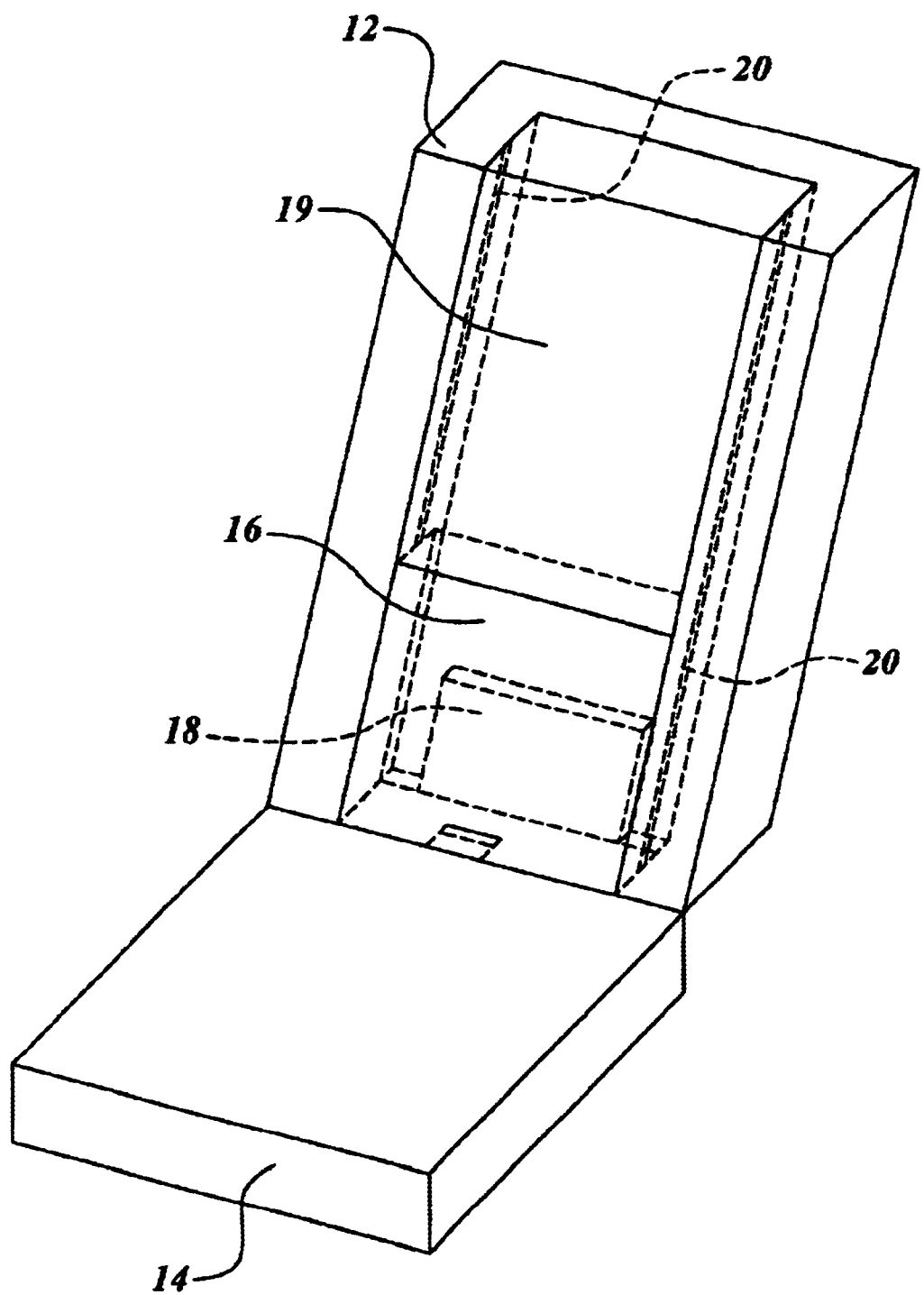
FIG. 1b is a phantom view of the seat in position as an adult seat.

FIG. 1b is a phantom view of the seat and back assembly 10 in its folded state. Starting from the seat cushion 14, the audio-visual entertainment module 18 is stored behind the lower back cushion 16. The rails 20 are embedded within the cavity defined by the seat wings and back 12. The upper seat back cushion 19 is slid upward relative to its position in FIG. 1a along the rails 20 to allow the lower back cushion 16 to pivot into place below it.

Figure 2A:
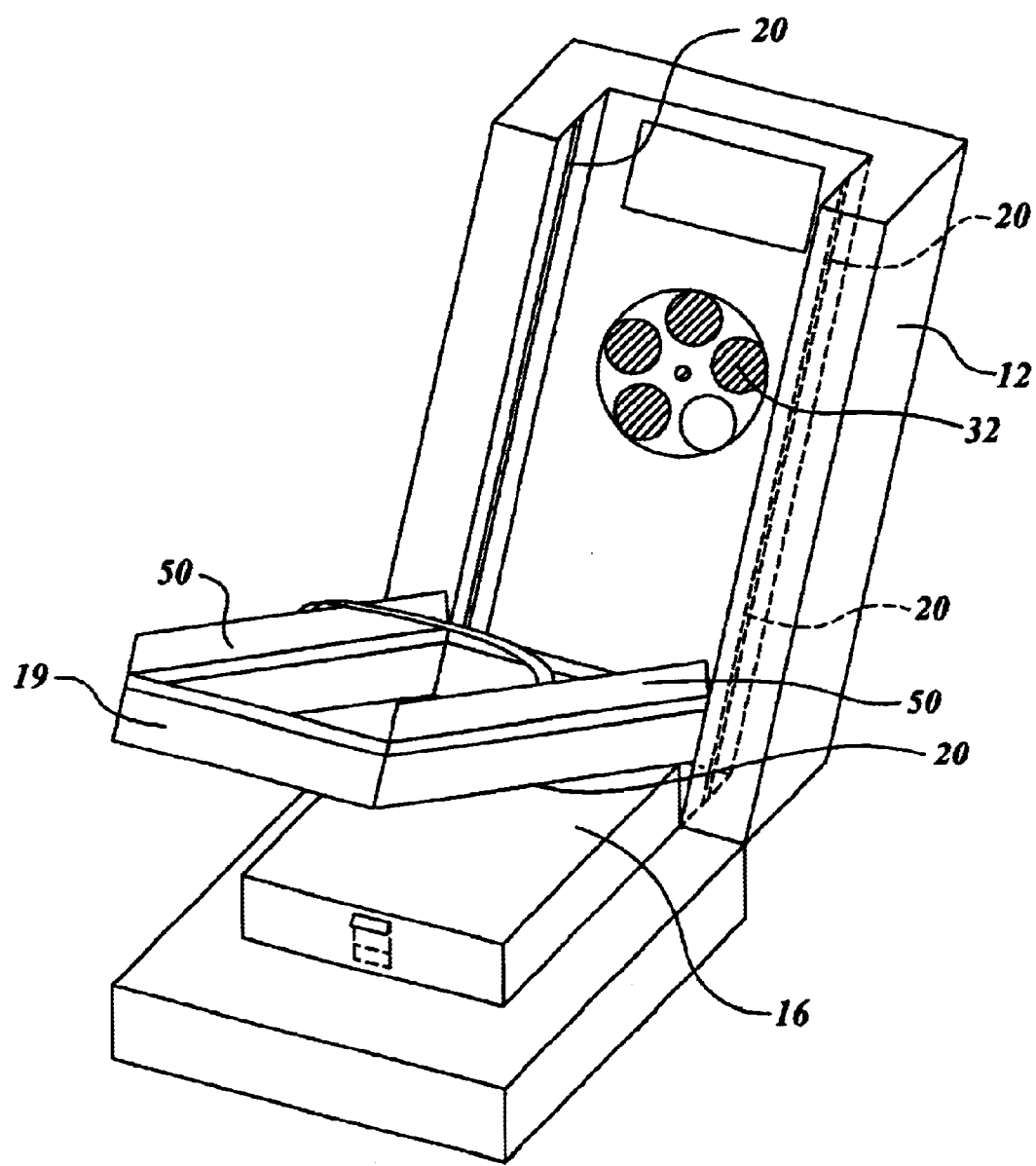
FIG. 2a is a phantom view of the seat in position as an infant seat.

Referring now to FIG. 2a, is configured to receive an infant. The lower back cushion 16 is pivoted outward to a substantially horizontal position. The upper back cushion 19 has slid downward on the rails 20 and further is pivoted outward to a substantially horizontal position offset just above the substantially horizontal lower back cushion 16. Two bolsters 50 are configured in their extended position to provide sideways restraint to an infant (not shown) lying on the upper surface of the upper back cushion 19. Belt take-up reels 32 carry the safety belts including the shoulder safety belts 22 and the crotch safety belt 29 (not shown).

Figure 2B:
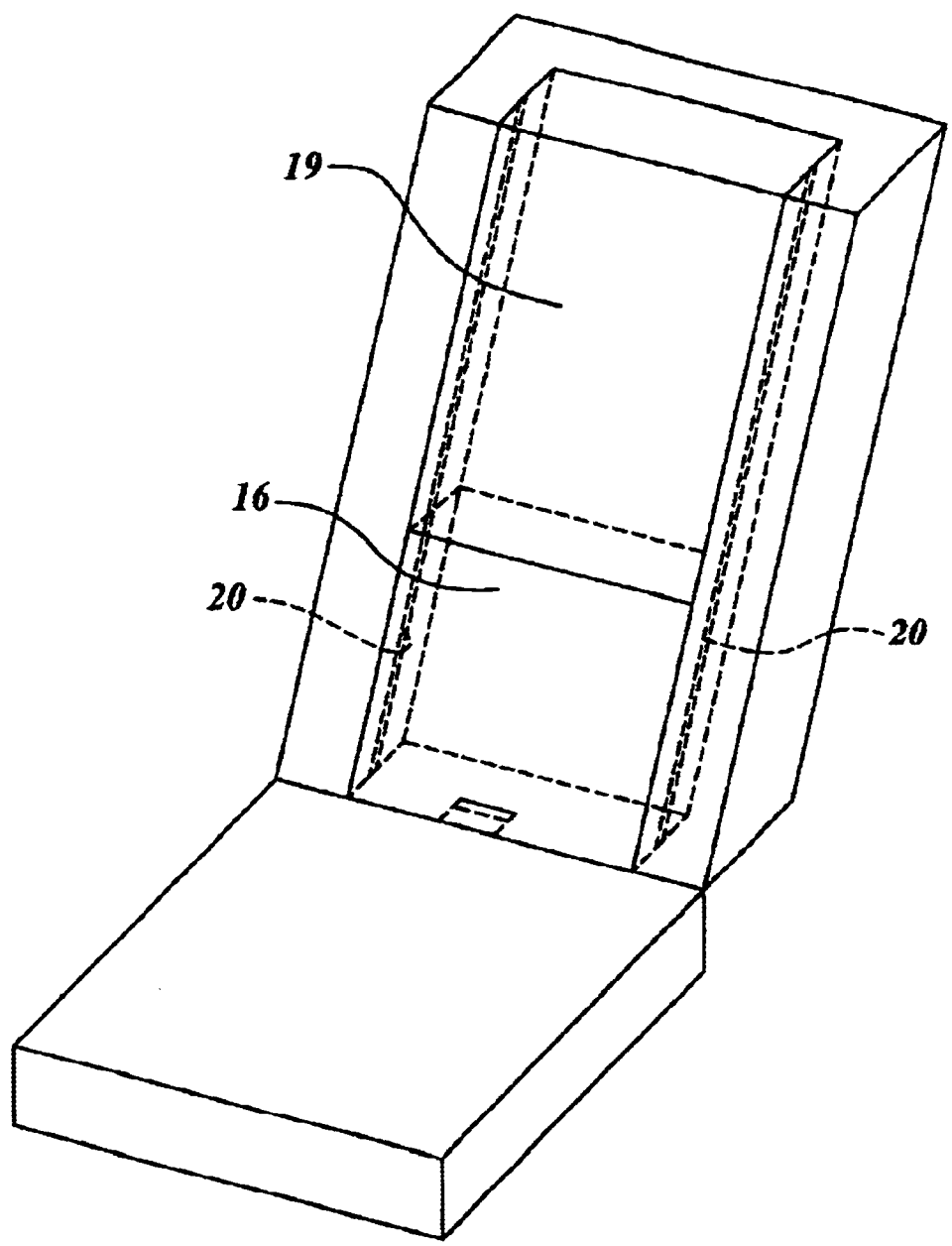
FIG. 2b is a phantom view of the seat in position as an adult seat.

Referring to FIG. 2b, the seat back assembly 10 is configured to receive an adult back. The lower seat back cushion 16 is pivoted to a substantially vertical position between the rails 20. The upper seat back cushion is at the uppermost boundary of its sliding movement between the rails 20 and in a substantially vertical attitude.

Figure 3A:
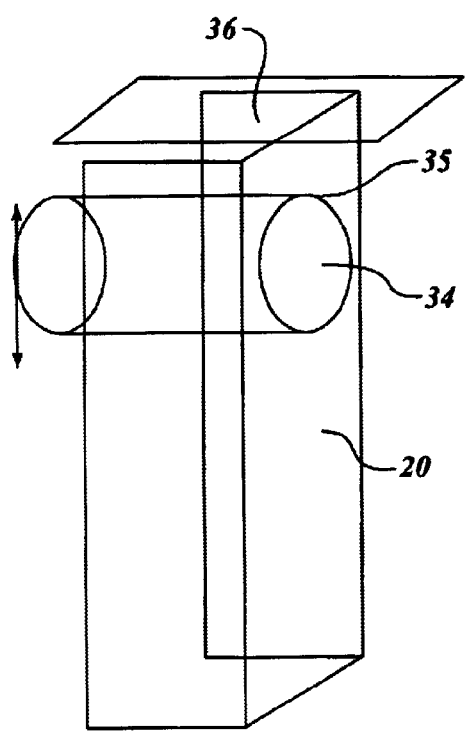
FIG. 3a is a detail view of one embodiment of a latching and sliding pin mechanism.

FIG. 3a details the latching and sliding facility of a pin 34. The pin 34 rests in the channel defined by the rail 20 immediately beneath the upper surface 36 of the seat wings and back 12. In that position, the pin 34 is free to slide the length of the channel defined by the rail 20. Appropriately-spaced holes 35 defined within the channel receive the pin 34 when the is extended to provide a latching mechanism.

Figure 3B:
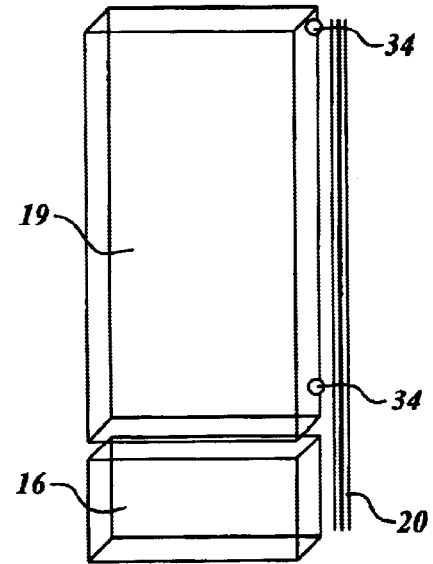
FIG. 3b is a perspective view of one embodiment of a latching and sliding pin mechanism.

FIG. 3b portrays the pins 34 in relationship to the upper back cushion 19. The rail 20 extends the entire height of the lower back cushion 16 and the upper back cushion 19 in their substantially vertical positions. The rail 20 receives the pins 34. When the lower back cushion 16 is pivoted to its substantially horizontal position (not shown), the pins 34 riding in the rail 20 slidingly move to fill the space vacated by the lower back cushion 16.

Figure 4:
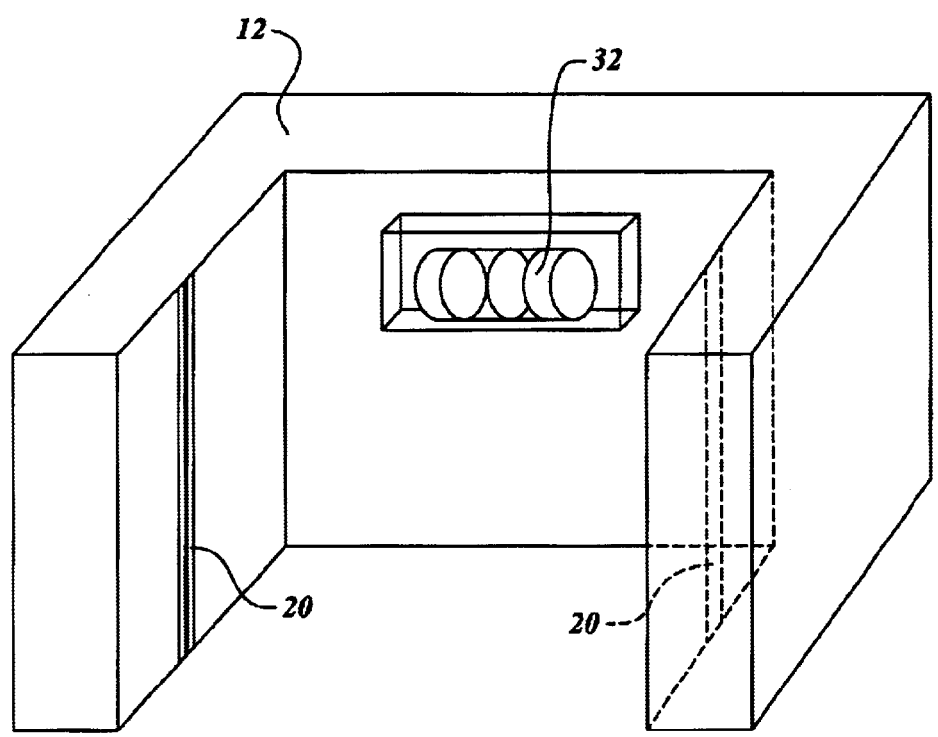
FIG. 4 is a perspective view of the wing and back cushion.

FIG. 4 illustrates placement of the rails 20 within the seat wings and backs. The seat wings and back 12 make up the frame (not shown) of the seat assembly. The seat wings and back 12 provide support for the rails 20 in their substantially vertical position. The belt take-up reels 32 carry the safety belts (not shown).

Figure 5A:
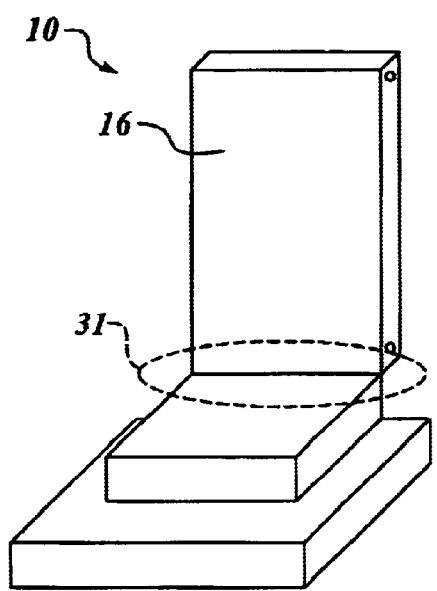
FIG. 5 is a perspective view of the hinging upholstery the child seat.
Figure 5B:
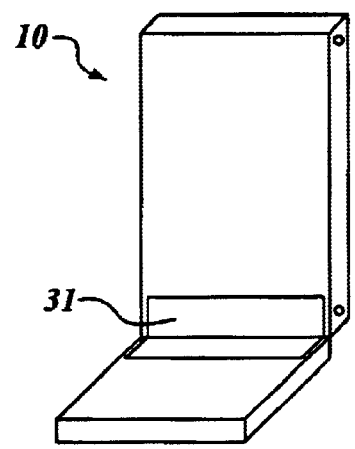

Referring to FIGS. 5a and b, an alternate method of enabling the configuration of the seatback is illustrated. Rather than pivoting the lower back cushion 16 at its lower extremity, the lower seat back 16 is hingedly attached to the upper seat back 19. So configured, the lower seat back 16 pivots outward to its substantially horizontal position from its upper extremity rather than its lower extremity. To effect such a pivoting, a joint between the upper seat back 19 and the lower seat back 16 is illustrated in FIG. 5b and in one embodiment, if made of reinforcing cloth material 31.

Figure 6:
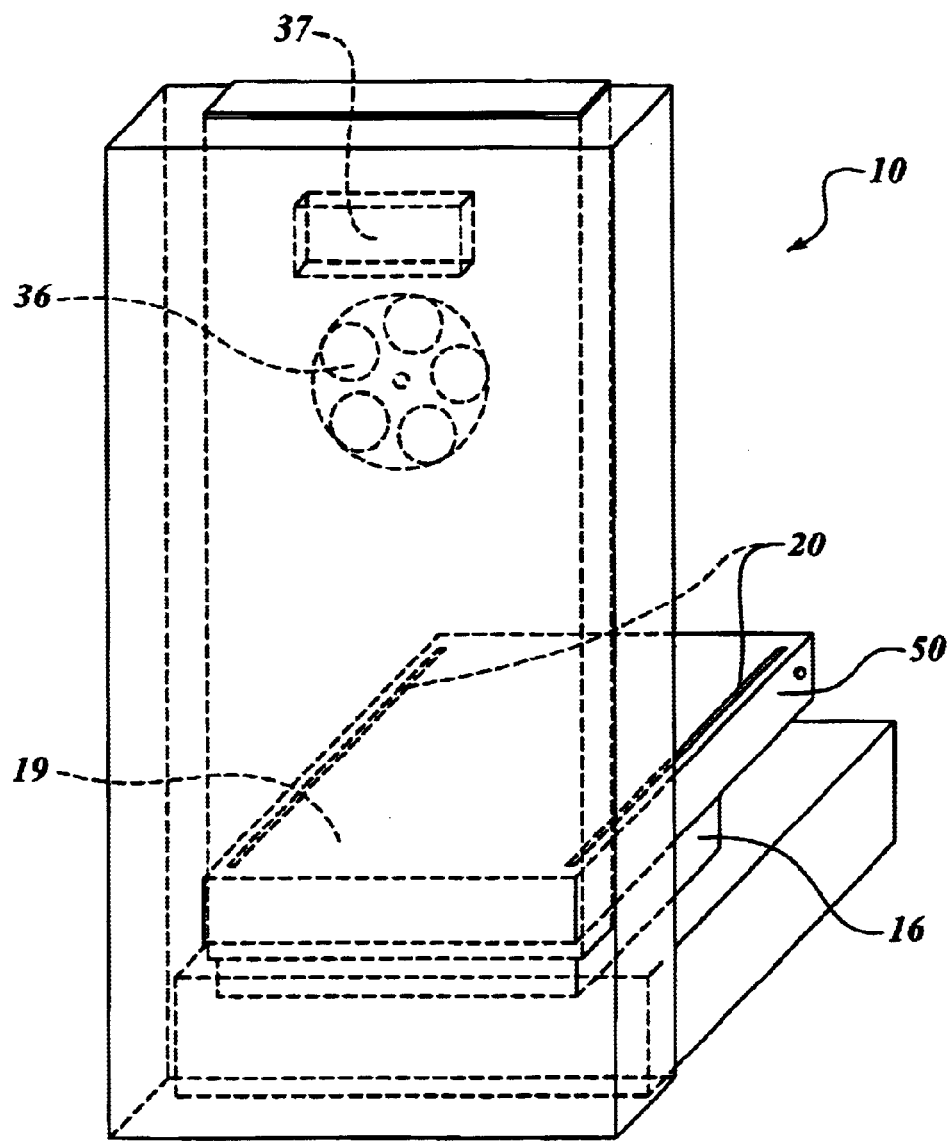
FIG. 6 is a reverse phantom perspective view of the seat as an infant seat.

FIG. 6 is a phantom view of the seat back assembly 10 configured to receive an infant. The bolsters 50 that provide side-to-side security for the infant are contained within the upper seat back 19 in their non-deployed position. The upper seat back 19 is in its substantially horizontal position offset above the lower seat back 16 (also in its substantially horizontal position). Together the seatbacks 16 and 19 rest above the substantially horizontal seat cushion 14. The upper surface 36 is at the upper extreme of the rails 20. A pocket 37 is defined within the seatback 12 for receiving an infant's pillow (not shown).

Figure 7A:
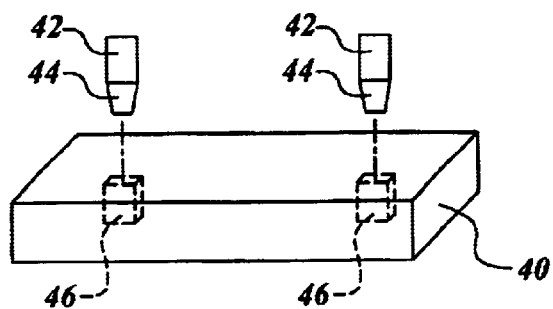
FIG. 7a is a perspective view of the integrated infant pillow.

Referring to FIG. 7a, a pillow 40 for an infant is shown. Stored in the pocket 37 (FIG. 6), the pillow 40 is anchored to the upper surface of the upper seat back 19 (not shown) by two anchoring straps 42. The anchoring straps 42 terminate in a male coupling device 44. The male coupling device 44 is received by a pair of female coupling devices 46 securely fastened to the pillow 40.

Figure 7B:
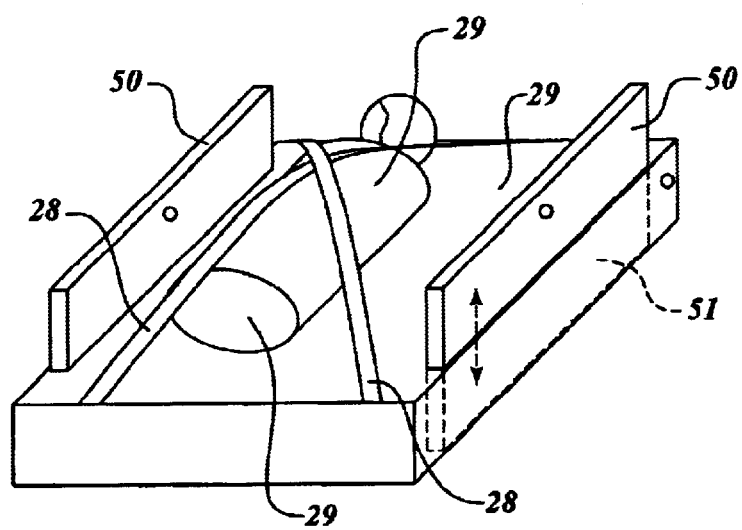
FIG. 7b is a detail view of the infant seat.
Figure 8:
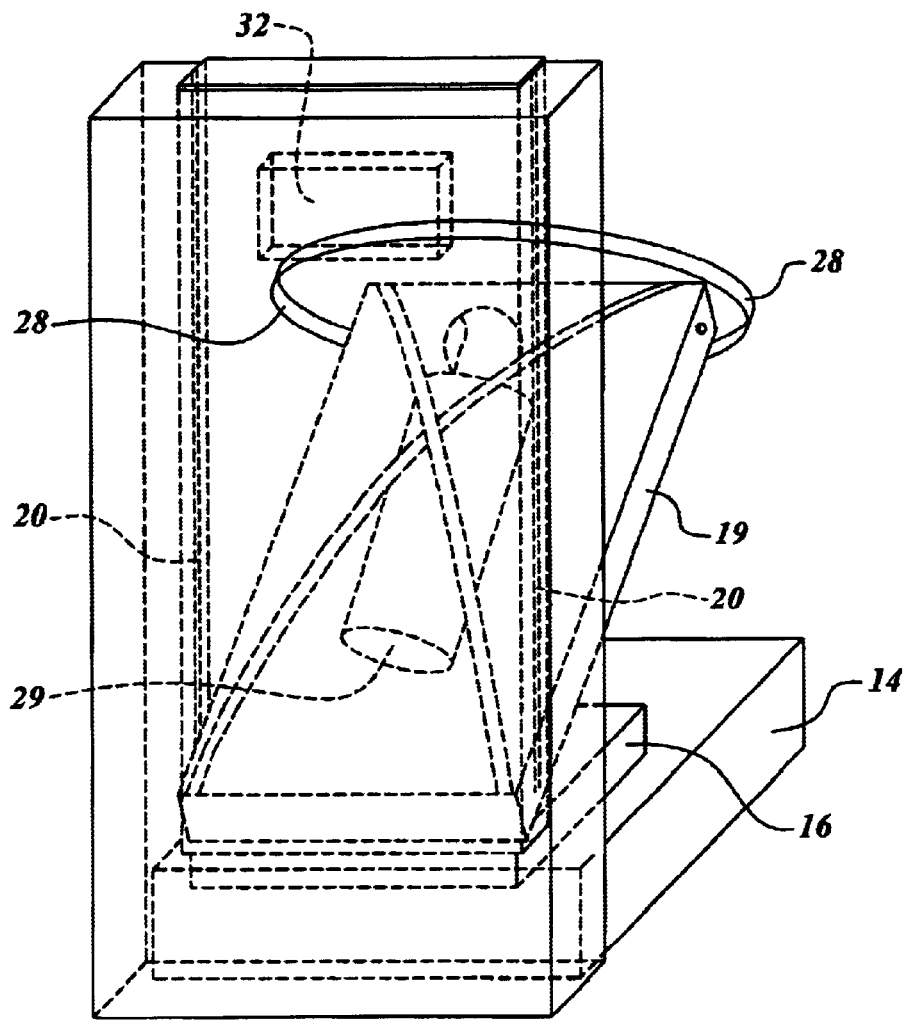
FIG. 8 is a detail view of an alternate embodiment.

Referring to FIG. 7b, an enablement for securing an infant 29 is shown. Two sliding bolsters 50 extend out of pockets 51 defined in the upper seat back cushion 19. In addition, a pair of safety belts 28 lap over the infant 29 in a manner suitable for restraint. FIG. 8 portrays how the security of the system can be further enhanced by the use of the safety belts 28 that extend from the belt take up reels 32. The safety belts 28 cant the upper seat back cushion 31 at an angle between the substantially horizontal and substantially vertical positions of the upper seat back cushion 19 and the lower seat back cushion 16 in its substantially horizontal position along with the seat cushion 14. The seat rails 20 are positioned in the seat wings and back 12.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A seat back cushion assembly for a vehicle, the assembly comprising:
    a cushion frame configured to pivotally attach to a seat frame to form a seat assembly;
    a first seat cushion rotatably and slidingly attached to the cushion frame and configured to rotate from a first position to a second position and to slide from a second position to a third position such that in the first position the first seat cushion is configured to receive an infant, the first seat cushion being configured in the second and third positions to serve as a cushion seat back; and
    a second seat cushion rotatably attached to the cushion frame, the second seat cushion being configured to rotate from a fourth position to a fifth position; such that in the fourth position the second seat cushion cooperates with the first seat cushion to form a seat for receiving a child and in the fifth position the second seat cushion cooperates with the first cushion in the third position to form a seat back for an adult.

2. The seat back cushion assembly of claim 1, wherein a child's seat belt assembly is connected with the cushion frame and configured to be locked in restraining relation with respect to a seated child.

3. The seat assembly of claim 1, wherein the second seat cushion provides an anchor point for the child's seat belt assembly between legs of the seated child.

4. The seat assembly of claim 1, wherein the child's seat belt assembly includes a pair of belts each associated with respective take-up reels, the belts extending from the respective take-up reels forwardly of the first seat cushion in the second position for extension over the shoulders of the seated child.

5. The seat assembly of claim 1, wherein an infant's seat belt assembly is connected with the cushion frame and configured to be locked in restraining relation with respect to an infant lying on the first seat cushion while the first seat cushion is in the first position.

6. A seat assembly for a vehicle, the assembly comprising:
    a seat frame for securement within a vehicle including a substantially vertical frame member;
    a seat back cushion assembly movably mounted on the substantially vertical frame member, the seat back cushion assembly being movable between first, second, and third positions, the cushion assembly configured such that:
        in the first position, the cushion assembly is configured for engaging the back of an adult sitting on an adult seat cushion;
        in the second position, the cushion assembly is configured to include a child's seat cushion disposed in a substantially horizontal attitude vertically displaced above the adult seat cushion for engaging a child sitting thereon and a cushioned child's seat back in a first situation extending vertically from the cushioned child's seat for engaging the back of the child sitting on the cushioned child's seat; and
        in the third position, the cushion assembly is configured to form an infant's recliner assembly wherein the cushioned child's seat is rotated to a second situation disposed in a substantially horizontal attitude and vertically displaced above the operative position of the seat cushion assembly for engaging an infant lying thereon.

7. The seat assembly of claim 6, wherein the seat back cushion assembly includes a first cushion hingedly attached to the substantially vertical frame member.

8. The seat assembly of claim 6, wherein the seat back cushion assembly includes a second cushion slidingly and hingedly attached to the substantially vertical frame member.

9. The seat assembly of claim 6, wherein a child's seat belt assembly is connected with the seat frame and configured to be locked in restraining relation with respect to a seated child sitting on the cushion assembly in the second position.

10. The seat assembly of claim 6, wherein the cushioned child's seat provides an anchor point for the child's seat belt assembly between legs of the child sitting on the cushion assembly in the second position.

11. The seat assembly of claim 10, wherein the child's seat belt assembly includes a pair of belts each associated with respective take-up reels, the belts extending from the respective take-up reels forwardly of the cushioned child's seat back for extension over the shoulders of the child sitting on the cushion assembly in the second position.

12. The seat assembly of claim 6, wherein an infant's seat belt assembly is connected with the seat frame and configured to be locked in restraining relation with respect to the infant lying on the cushion assembly while in the third position.

13. A seat assembly for a vehicle, the assembly comprising:

a seat frame for securement within a vehicle including a substantially vertical frame member;

means for movably mounting a cushion assembly on the substantially vertical frame member, the seat back cushion assembly being movable between first, second, and third positions, the cushion assembly configured such that:

in the first position, the cushion assembly is configured for engaging the back of an adult sitting on the adult seat cushion;

in the second position, the cushion assembly is configured to include a child's seat cushion disposed in a substantially horizontal attitude vertically displaced above the adult seat cushion for engaging a child sitting thereon and a cushioned child's seat back in a first situation extending vertically from the cushioned child's seat for engaging the back of the child sitting on the cushioned child's seat; and in the third position, the cushion assembly is configured to form an infant's recliner assembly wherein the cushioned child's seat is rotated to a second situation disposed in a substantially horizontal attitude and vertically displaced above the operative position of the seat cushion assembly for engaging an infant lying thereon.

14. The seat assembly of claim 13, wherein the seat back cushion assembly includes a first cushion hingedly attached to the substantially vertical frame member.

15. The seat assembly of claim 13, wherein the seat back cushion assembly includes a second cushion slidingly and hingedly attached to the substantially vertical frame member.

16. The seat assembly of claim 13, wherein a child's seat belt assembly is connected with the seat frame and configured to be locked in restraining relation with respect to a seated child sitting on the cushion assembly in the second position.

17. The seat assembly of claim 13, wherein the cushioned child's seat provides an anchor point for the child's seat belt assembly between legs of the child sitting on the cushion assembly in the second position.

18. The seat assembly of claim 13, wherein the child's seat belt assembly includes a pair of belts each associated with respective take-up reels, the belts extending from the respective take-up reels forwardly of the cushioned child's seat back for extension over the shoulders of the child sitting on the cushion assembly in the second position.

19. The seat assembly of claim 13, wherein an infant's seat belt assembly is connected with the seat frame and configured to be locked in restraining relation with respect to the infant lying on the cushion assembly while in the third position.

20. A method for deploying an infant mattress from a vehicle seat, the method comprising:

articulating a hingedly attached child's seat cushion from a seat back cushion having a seat back frame such that the child's seat cushion moves from a substantially vertical attitude to a substantially horizontal attitude;

sliding sliders slidingly attached to the seat back frame from a first position to a second position, the second position disposing an infant's mattress rotatably attached to the sliders into contact with the child's seat cushion;

rotating the infant's mattress from a substantially vertical attitude to a substantially horizontal attitude.

21. The method of claim 20, further including:

placing an infant on the infant's mattress.

22. The method of claim 21, further including:

extending belts from suitably located belts take-up reels; and securing at suitably located anchoring points on the infant's mattress.

23. The method of claim 22, further including:

tightening the belts by drawing the belts in a direction to establish a restraining relationship between the infant and the secured belts.

24. The method of claim 23, further including:

locking the take-up reels against movement in an opposite direction so as to prevent pay-out of the belts.

* * * * *